Figure 1:
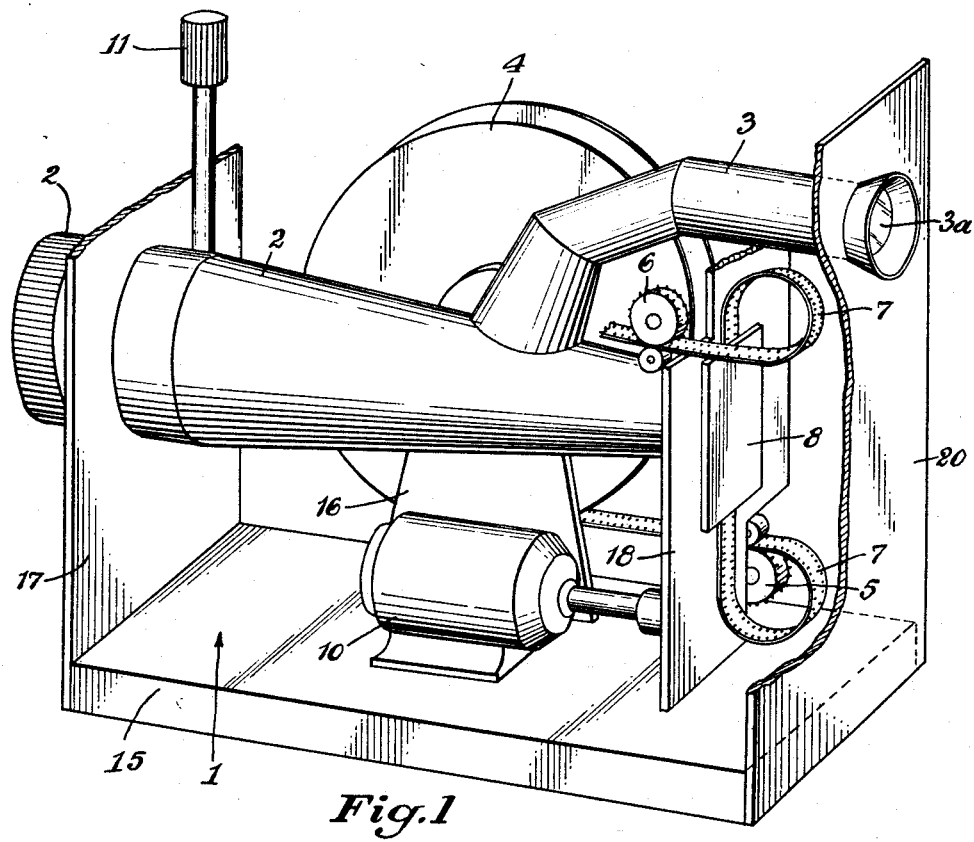

United States Patent Office
2,933,975
Patented Apr. 26, 1960

2,933,975

PHOTOGRAPHIC APPARATUSES

Rudolf Taesler, Kiel, Germany, assignor to Zeiss Ikon A.G. Stuttgart, Stuttgart, Germany Application April 11, 1958, Serial No. 727,992

Claims priority, application Germany April 13, 1957

4 Claims. (Cl. 88—16)

The invention relates to photographic apparatuses, particularly to motion picture cameras and motion picture projectors for small film such as 8 mm. or 16 mm. films.

The invention is particularly directed to such motion picture cameras and projectors which are equipped with a lens system having a continually adjustable focal length. Photographic apparatuses of this type have the disadvantage that owing to the employment of long and heavy lens attachments the appearance and the weight distribution is poor and the manipulation is difficult, because the lens attachments which are mounted on the front wall of the camera casing extend a considerable distance forwardly. In reflex cameras the additional disadvantage has to be taken into account that the view finder has to be provided with a rather long viewing tube which extends very far rearwardly.

It is an object of the present invention to provide a camera in which the film reels are arranged on opposite sides of the camera lens system and in axial alignment with each other, but the film reels are arranged entirely in front of the space in which the film path is arranged. Preferably, the film path, including the film gate, is arranged in rear of the outer edges of the film reels and between the two oppositely arranged film reels, while the camera lens system with its substantially long mount is arranged within the space between the two film reels. In such an arrangement of the lens system, even if the latter is relatively long, it will extend only a small distance from the front wall of the camera casing and all the mentioned disadvantages of the known photographic motion picture camera of the type mentioned are eliminated.

With these and other objects in view, the invention will now be described in connection with a motion picture camera intended for the use of small film and which is equipped with a photographic lens system having an adjustable focal length.

Figure 2:
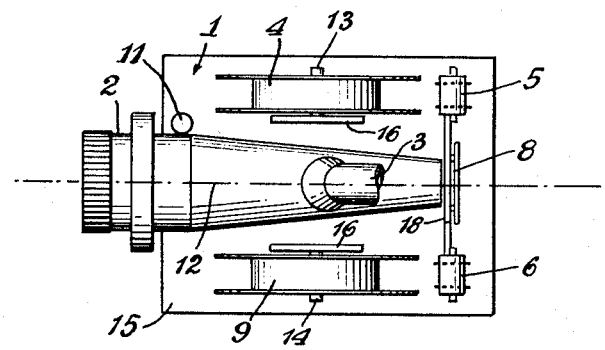

In the drawings:

Fig. 1 illustrates in a perspective view the principal parts of a motion picture camera, whereby the major portion of the camera casing has been omitted in order to disclose the arrangement of the parts in the interior thereof, and Fig. 2 illustrates diagrammatically a top plan view of the motion picture camera.

Referring to the drawings, the camera casing 1 is provided with a bottom wall 15, a front wall 17 which supports the barrel of the photographic lens system 2 and a rear wall 20. The camera casing 1 has mounted therein two film reels 4 and 9 rotatable about shafts 13 and 14 arranged in axial alignment with a horizontal axis which intersects the optical axis 12 of the camera lens system 2 at right angles. The film reels 4 and 9 are arranged in two spaced parallel vertical planes and are carried by bearing supports 16 mounted on the bottom wall 15 to both sides of that portion of the camera lens system 2 which is arranged within the camera casing 1. Fig. 1 illustrates only one bearing support 16.

The sprocket drums 5 and 6 for moving the motion picture film 7 away from one film reel and towards the other film reel are arranged directly in rear of the film reels 4 and 9. In the embodiment shown, the film is taken off the film reel 4 by the sprocket drum 5, forms a loop and then moves through the film gate 8 on a vertical partition 18 and after forming another loop, passes over the sprocket drum 6 and is wound upon the other film reel 9.

The photographic lens system 2 of the motion picture camera is provided with a relatively long lens supporting barrel, arranged with its longer rear portion between the film reels 4 and 9 and projects with its front portion a relatively small distance forward through the front wall of the camera casing 1.

The adjustment member 11 for the photographic lens system 2, which has a variable focal length, is arranged at the front wall of the camera casing 1 and is accessible from the outside thereof. A reflex view finder 3 extends first upwardly from the camera lens system and then extends rearwardly and is provided with the viewing aperture 3a in the rear wall of the camera casing 1.

A motor 10 within the camera casing serves the purpose of operating the film advancing mechanism and the rotatable shutter, which is covered by the partition 18 and therefore it is not shown in Fig. 1.

If the invention is to be employed in connection with a motion picture projector, the construction of such a projector is basically the same as the one of a motion picture camera, except that a motion picture projector requires the addition of an illumination device.

What I claim is:

1. A photographic apparatus, such as a motion picture camera or motion picture projector, including a camera casing having a longitudinal base, a front wall and a rear wall extending upwardly from the front and rear edges of said base, a photographic lens system having a barrel extending a considerable distance from the front wall toward the rear wall, said lens system barrel being supported by the front wall with its rear end terminating a short distance from said rear wall a film gate mounted on a partition in said casing between the rear end of said lens system and said rear wall, two film reels arranged with their axes in axial alignment with one another with the axis of said reels intersecting the axis of said photographic lens systems, the axes of said reels being positioned substantially equal distances from said front and rear walls, one film reel being arranged on one side of said lens system and the other film reel on the other side of said lens system, sprocket drums for moving the film from one said reel through said film gate and to the other one of said reels, and a motor with its armature axis extending in a direction toward the rear wall adapted to drive said film through the gate mounted on said partition, the arrangement of said sprocket drums and said film gate being such that the film is moved in a path in rear of the rear edges of said reels.

2. A photographic apparatus, such as a motion picture camera or motion picture projector, including a camera casing having a longitudinal base, a front wall and a rear wall extending upwardly from the front and rear edges of said base, a photographic lens system having a barrel extending a considerable distance from the front wall toward the rear wall, said lens system barrel being supported by the front wall with its rear end terminating a short distance from said rear wall, a partition in said casing, a film gate mounted on said partition in said casing between the rear end of said lens system and said rear wall, two film reels arranged with their axes in axial alignment with one another with the axis of said reels intersecting the axis of said photographic lens system at right angles, the axes of said reels being positioned substantially equal distances from said front and rear walls, one film reel being arranged on one side of said lens system and the other film reel on the other side of said lens system, sprocket drums for moving the film from one said reel through said film gate and to the other one of said reels, the arrangement of said sprocket drums and said film gate being such that the film is moved in a path in rear of the rear edges of said reels, and a view finder including a tubular member extending from a point intermediate the ends of said barrel of the photographic lens system to project first upwardly and then rearwardly toward the rear wall of said camera casing and above the axis of said lens system, and a viewing aperture for said view finder arranged in said rear wall.

3. A photographic apparatus as claimed in claim 1, including a photographic lens system having a variable focal length adapted to be adjusted from a position externally of said casing.

4. A photographic apparatus as claimed in claim 1, including a photographic lens system having a variable focal length, and manually operable means mounted adjacent said front wall of said camera casing and adapted to be adjusted from a position externally of said casing to continuously vary the focal length of said photographic lens system.

References Cited in the file of this patent

UNITED STATES PATENTS

| | | |
|---|---|---|
| 1,363,822 | Stringham | Dec. 28, 1920 |
| 1,369,127 | Ray | Feb. 22, 1921 |
| 2,622,497 | Cornut | Dec. 23, 1952 |

FOREIGN PATENTS

| | | |
|---|---|---|
| 674,097 | France | Oct. 15, 1929 |